(12) United States Patent
Li et al.

(10) Patent No.: US 10,696,900 B2
(45) Date of Patent: Jun. 30, 2020

(54) METAL OXIDE/SILICON DIOXIDE-COATED QUANTUM DOT AND METHOD FOR PREPARING SAME

(71) Applicant: Liang Li, Shanghai (CN)

(72) Inventors: Liang Li, Shanghai (CN); Zhichun Li, Shanghai (CN)

(73) Assignee: Liang Li, Shanghai (CN)

( * ) Notice: Subject to any disclaimer, the term of this patent is extended or adjusted under 35 U.S.C. 154(b) by 88 days.

(21) Appl. No.: 15/996,510

(22) Filed: Jun. 3, 2018

(65) Prior Publication Data
US 2018/0273839 A1    Sep. 27, 2018

Related U.S. Application Data

(63) Continuation of application No. PCT/CN2016/107168, filed on Nov. 25, 2016.

(30) Foreign Application Priority Data

Jun. 27, 2016   (CN) .......................... 2016 1 0478181

(51) Int. Cl.
| | |
|---|---|
| C09K 11/02 | (2006.01) |
| C09K 11/66 | (2006.01) |
| C09K 11/70 | (2006.01) |
| C09K 11/88 | (2006.01) |
| B82Y 30/00 | (2011.01) |
| B82Y 20/00 | (2011.01) |
| B82Y 40/00 | (2011.01) |

(52) U.S. Cl.
CPC .......... *C09K 11/025* (2013.01); *C09K 11/665* (2013.01); *C09K 11/703* (2013.01); *C09K 11/883* (2013.01); *B82Y 20/00* (2013.01); *B82Y 30/00* (2013.01); *B82Y 40/00* (2013.01); *Y10S 977/774* (2013.01); *Y10S 977/818* (2013.01); *Y10S 977/824* (2013.01); *Y10S 977/825* (2013.01); *Y10S 977/892* (2013.01); *Y10S 977/896* (2013.01); *Y10S 977/95* (2013.01)

(58) Field of Classification Search
CPC ..................................................... C09K 11/025
See application file for complete search history.

(56) References Cited

U.S. PATENT DOCUMENTS

| | | | | |
|---|---|---|---|---|
| 2012/0252140 | A1* | 10/2012 | Aimiya | C01B 33/12 436/501 |
| 2018/0230376 | A1* | 8/2018 | Schmidt | C09K 11/025 |

FOREIGN PATENT DOCUMENTS

| | | |
|---|---|---|
| CN | 103421513 A | 12/2013 |
| CN | 105086993 A | 11/2015 |
| CN | 105664714 A | 6/2016 |

* cited by examiner

*Primary Examiner* — Matthew E. Hoban
(74) *Attorney, Agent, or Firm* — Wayne & Ken, LLC; Tony Hom

(57) ABSTRACT

A metal oxide/silicon dioxide-coated quantum dot and a preparation method thereof are provided. The metal oxide/silicon dioxide is selected from aluminum oxide/silicon dioxide, zirconium dioxide/silicon dioxide, titanium dioxide/silicon dioxide or zinc oxide/silicon dioxide, and the content of the metal oxide/silicon dioxide in the metal oxide/silicon dioxide-coated quantum dot is 1 wt % to 98 wt %. The metal oxide/silicon dioxide-coated quantum dot is prepared by one of a sol-gel method and a pyrolysis method.

8 Claims, 6 Drawing Sheets

METAL OXIDE/SILICON DIOXIDE-COATED QUANTUM DOT AND METHOD FOR PREPARING SAME

TECHNICAL FIELD

The present application relates to the technical field of preparation of semiconductor nanomaterials (quantum dots), and in particular to a metal oxide/silicon dioxide-coated quantum dot and a preparation method thereof.

BACKGROUND OF THE PRESENT INVENTION

Since discovered in 1980s, the quantum dots have attracted intensive attention from the scientific research field and the industrial field. Compared with the conventional fluorescent material, the fluorescence of quantum dots have the advantages of narrow fullwidth at half maxima, small particle size without scattering loss, size-tunable emission color and the like. Thus, quantum dots are widely regarded as having a promising application prospect in the fields such as display, illumination and biological fluorescent labeling. A large amount of manpower and material resources have been invested into the research on quantum dot materials in various countries. Accordingly, the photoelectric performance of the quantum dots is improved continuously, and prototype devices in the related fields have emerged. The application of quantum dots as the fluorescent material in the display field is regarded as the first breakthrough in the application fields of quantum dots. Since 2014, Samsung Electronics, LG and TCL have launched a variety of quantum-dot TV sets. This indicates a significant growth rate. Many institutions hold an optimistic attitude toward the application of quantum dots as the display devices, LEDs and the like. However, before the quantum dots are really applied as an excellent fluorescent material and become a novel material beneficial to mankind, there are still many basic scientific problems to be solved. Among those problems, the "stability of quantum dots" has been plaguing many scientists and has become one of the bottlenecks restricting the development of quantum dots. The stability of quantum dots in other application fields such as solar cells, biomarkers and environmental pollution treatment also becomes a great challenge.

At present, there are mainly three methods for improving the stability of quantum dots. (1) Core-shell quantum dots are prepared so that the stability is improved. However, the improvement to the stability of quantum dots is limited by only increasing the thickness of the shell. (2) The stability of quantum dots is enhanced by coating them with silicon dioxide or polymer. However, these methods have a common deficiency that the surfaces of quantum dots will be damaged during the coating process and the photoluminescence quantum yield of the quantum dots are thus reduced. (3) By preparing quantum dots doped with a passivating element, the stability of quantum dots may be improved to some extent. Therefore, improving the stability of quantum dots becomes a problem to be solved urgently.

SUMMARY OF THE PRESENT INVENTION

An objective of the present application is to overcome the defects in the prior art and provide a metal oxide/silicon dioxide-coated quantum dot and a preparation method thereof.

The objective of the present application may be realized by the following technical solutions.

A metal oxide/silicon dioxide-coated quantum dot is provided, wherein the metal oxide/silicon dioxide is selected from aluminum oxide/silicon dioxide, zirconium dioxide/silicon dioxide, titanium dioxide/silicon dioxide or zinc oxide/silicon dioxide, and the content of the metal oxide/silicon dioxide in the metal oxide/silicon dioxide-coated quantum dot is 1 wt % to 98 wt %.

The quantum dot is a non-core-shell quantum dot or a core-shell quantum dot.

The non-core-shell quantum dot is selected from a binary quantum dot, a ternary quantum, a quaternary quantum dot, a doped binary quantum dot, a doped ternary quantum or a doped quaternary quantum dot; wherein the binary quantum dot is $AX_1$, where A is selected from the group consisting of bismuth, cadmium, zinc, mercury, lead, tin, gallium, indium, calcium, strontium, cesium, magnesium, barium or copper, and $X_1$ is sulfur, selenium, nitrogen, phosphorus, arsenic, tellurium and antimony;

the ternary quantum dot is $A_1A_2X_2$, where each of $A_1$ and $A_2$ is selected from the group consisting of methyl amino, bismuth, cesium, cadmium, zinc, mercury, lead, tin, gallium, indium, calcium, magnesium, strontium, barium and copper, $A_1$ is different from $A_2$, and $X_2$ is selected from the group consisting of sulfur, selenium, nitrogen, phosphorus, arsenic, tellurium, chlorine, bromine, iodine and antimony;

the quaternary quantum dot is $A_1A_2A_3X_3$, where each of $A_1$, $A_2$ and $A_3$ is selected from the group consisting of cadmium, zinc, mercury, lead, tin, gallium, indium, calcium, cesium, magnesium, strontium, barium and copper, $A_1$, $A_2$ and $A_3$ are different from each other, and $X_3$ is selected from the group consisting of sulfur, selenium, phosphorus, arsenic, tellurium or antimony; and a doping element for a doped quantum dot is selected from the group consisting of magnesium, calcium, barium, strontium, aluminum, boron, zirconium, chromium, titanium, silver, gallium, hafnium, indium, bismuth, cobalt, copper, manganese, nickel, iron, tantalum and silicon.

The core-shell quantum dot comprises a core quantum dot and a shell; wherein the core quantum dot is selected from a binary quantum dot, a ternary quantum dot, a quaternary quantum dot, a doped binary quantum dot, a doped ternary quantum dot or a doped quaternary quantum dot; and the shell comprises a main body made of a semiconductor material selected from Group II-VI, II-V, III-VI, III-V, IV-VI, II-IV-V or II-IV-VI elements, the semiconductor material being selected from the group consisting of cadmium selenide, zinc selenide, mercury selenide, cadmium sulfide, zinc sulfide, mercury sulfide, cadmium telluride, zinc telluride, cadmium telluride, gallium nitride, indium nitride, gallium phosphide, gallium antimonide, indium gallium phosphide, zinc cadmium selenide and cadmium zinc sulfide; and a doped core-shell quantum dot comprises a doping element which is located in at least one of the core quantum dot and the shell and the doping element is selected from the group consisting of magnesium, calcium, barium, strontium, aluminum, boron, zirconium, chromium, titanium, silver, gallium, hafnium, indium, bismuth, cobalt, copper, manganese, nickel, iron, tantalum and silicon.

A method for preparing the metal oxide/silicon dioxide-coated quantum dot is provided, wherein the metal oxide/silicon dioxide-coated quantum dot is prepared by one of a sol-gel method and a pyrolysis method;

wherein the sol-gel method comprises:

(1) adding a quantum dot solution, a silylating agent and a metal oxide-corresponding metal precursor in a reaction vessel and mixing uniformly to produce a mixture;

(2) standing and subjecting the mixture to a sol-gel reaction; and (3) calcinating the resulting product to obtain the metal oxide/silicon dioxide-coated quantum dot;

wherein the pyrolysis method comprises:

(1) adding a quantum dot solution, a silylating agent reagent and a metal oxide-corresponding metal precursor into a high-pressure reactor to produce a mixture, and feeding nitrogen to remove oxygen from the high-pressure reactor;

(2) standing and subjecting the mixture to a pyrolysis reaction; and (3) centrifuging the resulting product after completing the pyrolysis reaction to remove the unreacted quantum dot solution, and calcinating the resulting product to obtain the metal oxide/silicon dioxide-coated quantum dot.

Preferably, the silylating agent is selected from tetramethoxysilane or tetraethoxysilane.

Preferably, the metal oxide-corresponding metal precursor is selected from an aluminum precursor, a zirconium precursor, a titanium precursor or zinc precursor;

wherein the aluminum precursor is selected from the group consisting of aluminum isopropoxide, aluminum sec-butoxide, aluminum acetylacetonate and lithium tri-tert-butoxy aluminum hydride;

the zirconium precursor is selected from the group consisting of zirconium propoxide, zirconium n-butoxide and zirconium acetylacetonate;

the titanium precursor is preferably tetraisopropyl titanate; and the zinc precursor is preferably diethylzinc.

Preferably, for the sol-gel method and the pyrolysis method, di-sec-butoxyaluminoxytriethoxysilane is used as both the silylating agent and the aluminum precursor.

In the sol-gel method, the sol-gel reaction is performed at a temperature of 15° C. to 90° C. and a relative humidity of 30% to 95%, and the resulting product is calcinated at 50° C. to 150° C.

In the pyrolysis method, the pyrolysis reaction is carried out at a temperature of 160° C. to 220° C. for 6 to 24 hours, and the resulting product is calcinated at 50° C. to 150° C.

Compared with the prior art, the present application has the following advantages.

1. The present application is simple in preparation process without use of any catalyst and achieves ligand exchange of the quantum dots, thus avoiding the damage to the quantum dot.

2. Compared with the uncoated quantum dot, the quantum dot coated with aluminum oxide/silicon dioxide, zirconium dioxide/silicon dioxide, titanium dioxide/silicon dioxide or zinc oxide/silicon dioxide prepared by the present application can effectively prevent moisture and oxygen from corroding the quantum dot due to the presence of double protective layers of aluminum oxide/silicon dioxide, zirconium dioxide/silicon dioxide, titanium dioxide/silicon dioxide or zinc oxide/silicon dioxide, so that the photo-stability is improved greatly.

DETAILED DESCRIPTION OF THE PRESENT INVENTION

The present invention will be described below in detail by specific embodiments with reference to the accompanying drawings.

Embodiment 1

Preparation of the Core-Shell CdSe/CdS Quantum Dot Coated with Aluminum Oxide/Silicon Dioxide a. (1) 30 mg of CdSe/CdS quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 100° C.;

b. (1) 30 mg of CdSe/CdS quantum dot solution, 220 μl of tetraethoxysilane and 0.4 mmol of aluminum isopropoxide were added in a reaction vessel and then mixed uniformly;

(2) the reaction system was stood for sol-gel reaction at a temperature of 40° C. and a relative humidity of 60%; and (3) the resulting product was calcinated at 100° C.;

c. (1) 30 mg of CdSe/CdS quantum dot solution and 150 μl of di-sec-butoxyaluminoxytriethoxysilane solution were added in a high-pressure reactor, and nitrogen was fed to remove oxygen;

(2) the pyrolysis reaction was carried out for 12 hours at a temperature of 200° C.; and (3) at the end of reaction, the reaction system was centrifuged to remove the unreacted quantum dot solution, and the resulting product was calcinated at 100° C.;

d. (1) 30 mg of CdSe/CdS quantum dot solution, 220 μl of tetraethoxysilane and 0.4 mmol of aluminum isopropoxide were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.;

e. (1) 30 mg of CdSe/CdS quantum dot solution, 110 μl of tetraethoxysilane and 150 μl of di-sec-butoxyaluminoxytriethoxysilane solution were added in a reaction vessel and then mixed uniformly;

(2) the reaction system was stood for sol-gel reaction at a temperature of 15° C. to 100° C., and a relative humidity of 30% to 95%; and (3) the resulting product was calcinated at 50° C. to 150° C.; and f. (1) 30 mg of CdSe/CdS quantum dot solution, 110 μl of tetraethoxysilane and 150 μl of di-sec-butoxyaluminoxytriethoxysilane solution were added in a high-pressure reactor, and nitrogen was fed to remove oxygen from the high-pressure reactor;

(2) the pyrolysis reaction was carried out for 6 to 24 hours at a temperature of 160° C. to 220° C.; and (3) the reaction system was centrifuged after completing the pyrolysis reaction to remove the unreacted quantum dot solution, and the resulting product was calcinated at 50° C. to 150° C.

Figure 1:
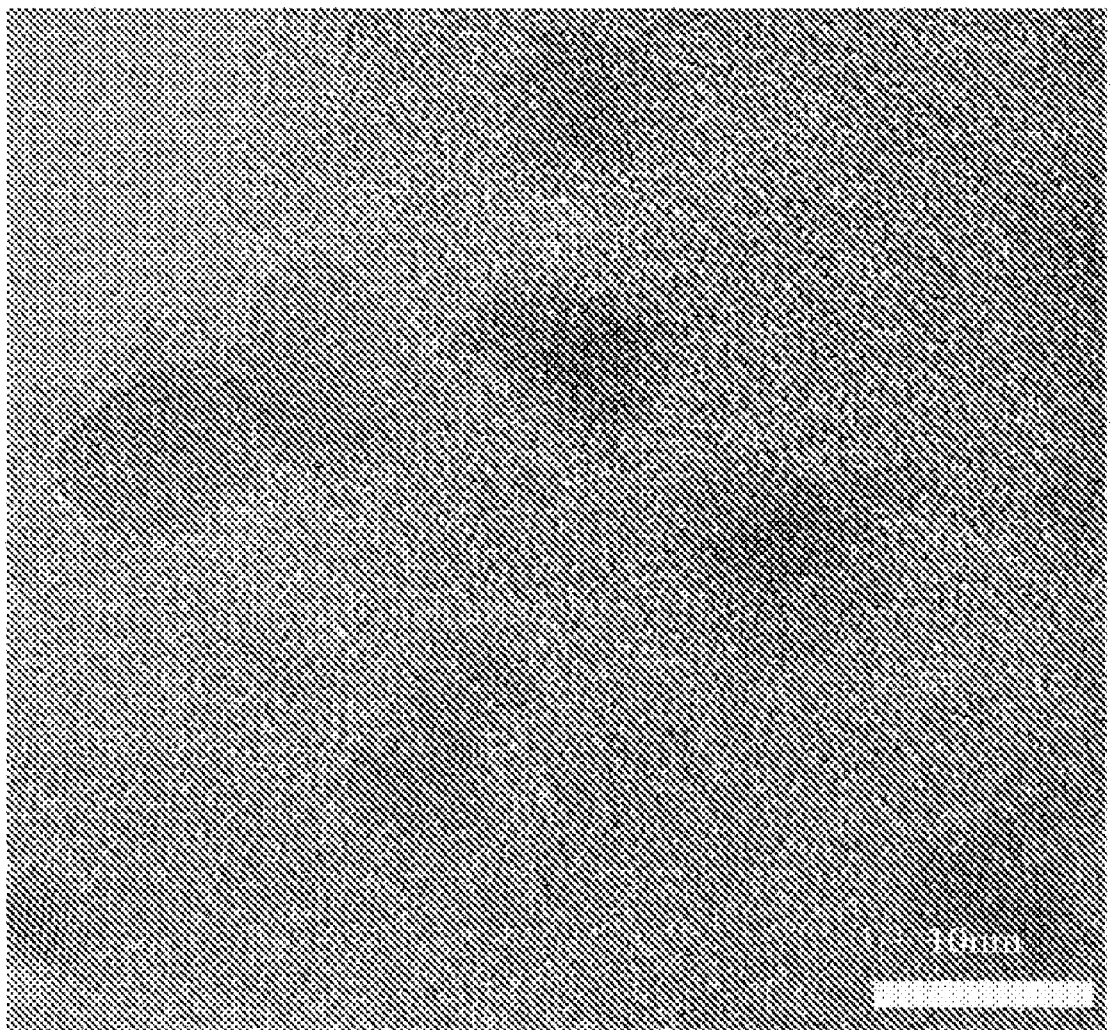
FIG. 1 shows a TEM picture of a CdSe/CdS quantum dot coated with aluminum oxide/silicon dioxide.

The TEM picture of the CdSe/CdS quantum dot coated with aluminum oxide/silicon dioxide prepared by the six methods a, b, c, d, e and f in this embodiment is shown in FIG. 1. It can be seen from FIG. 1 that the CdSe/CdS in the CdSe/CdS quantum dot coated with aluminum oxide/silicon dioxide are distributed uniformly in form of particles.

Embodiment 2

Preparation of the Aqueous Core-Shell CdTe/CdS Quantum Dot Coated with Aluminum Oxide/Silicon Dioxide a. (1) 30 mg of aqueous CdTe/CdS quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 100° C.;

b. (1) 30 mg of aqueous CdTe/CdS quantum dot solution, 220 μl of tetraethoxysilane and 0.4 mmol of aluminum isopropoxide were added in a reaction vessel and then mixed uniformly;

(2) the reaction system was stood for sol-gel reaction at a temperature of 40° C. and a relative humidity of 60%; and (3) the resulting product was calcinated at 100° C.;

c. (1) 30 mg of aqueous CdTe/CdS quantum dot solution and 150 μl of di-sec-butoxyaluminoxytriethoxysilane solution were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.;

d. (1) 30 mg of aqueous CdTe/CdS quantum dot solution, 220 μl of tetraethoxysilane and 0.4 mmol of aluminum isopropoxide were added in a high-pressure reactor, and nitrogen was fed to remove oxygen from the high-pressure reactor;

(2) the pyrolysis reaction was carried out for 12 hours at a temperature of 200° C.; and (3) at the end of reaction, the reaction system was centrifuged to remove the unreacted quantum dot solution, and the resulting product was calcinated at 100° C.

e. (1) 30 mg of aqueous CdTe/CdS quantum dot solution, 110 μl of tetraethoxysilane and 150 μl of di-sec-butoxyaluminoxytriethoxysilane solution were added in a reaction vessel and then mixed uniformly;

(2) the reaction system was stood for sol-gel reaction at a temperature of 15° C. to 100° C., and a relative humidity of 30% to 95%; and (3) the resulting product was calcinated at 50° C. to 150° C.; and f. (1) 30 mg of aqueous CdTe/CdS quantum dot solution, 110 μl of tetraethoxysilane and 150 μl of di-sec-butoxyaluminoxytriethoxysilane solution were added in a high-pressure reactor, and nitrogen was fed to remove oxygen from the high-pressure reactor;

(2) the pyrolysis reaction was carried out for 6 to 24 hours at a temperature of 160° C. to 220° C.; and (3) the reaction system was centrifuged after completing the pyrolysis reaction to remove the unreacted quantum dot solution, and the resulting product was calcinated at 50° C. to 150° C.

Figure 2:
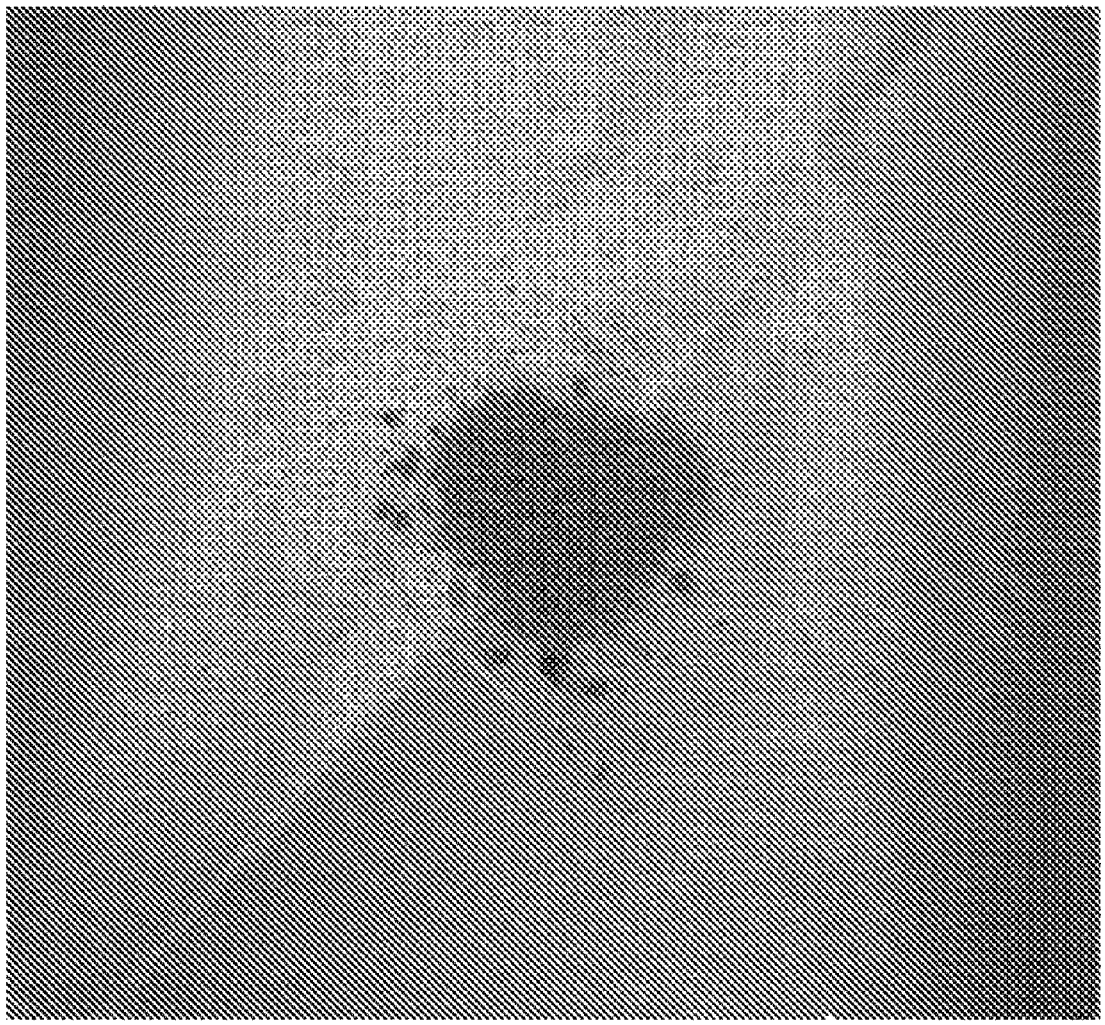
FIG. 2 shows a picture of CdTe/CdS quantum dot powder coated with aluminum oxide/silicon dioxide.

The aqueous CdTe/CdS quantum dot coated with aluminum oxide/silicon dioxide prepared by the six methods a, d, c, d, e and f in this embodiment is in form of uniform powder and is orange (although the orange color cannot be identified in FIG. 2 due to the gray picture).

Embodiment 3

Preparation of the Core-Shell CdSe/CdS Quantum Dot Coated with Zirconium Dioxide/Silicon Dioxide a. (1) 30 mg of CdSe/CdS quantum dot solution, 220 μl of tetraethoxysilane and 0.4 mmol of zirconium propoxide were added in a reaction vessel and then mixed uniformly;

(2) the reaction system was stood for sol-gel reaction at a temperature of 40° C. and a relative humidity of 60%; and (3) the resulting product was calcinated at 100° C.; and b. (1) 30 mg of quantum dot solution, 220 μl of tetraethoxysilane and 0.4 mmol of zirconium propoxide were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Figure 3:
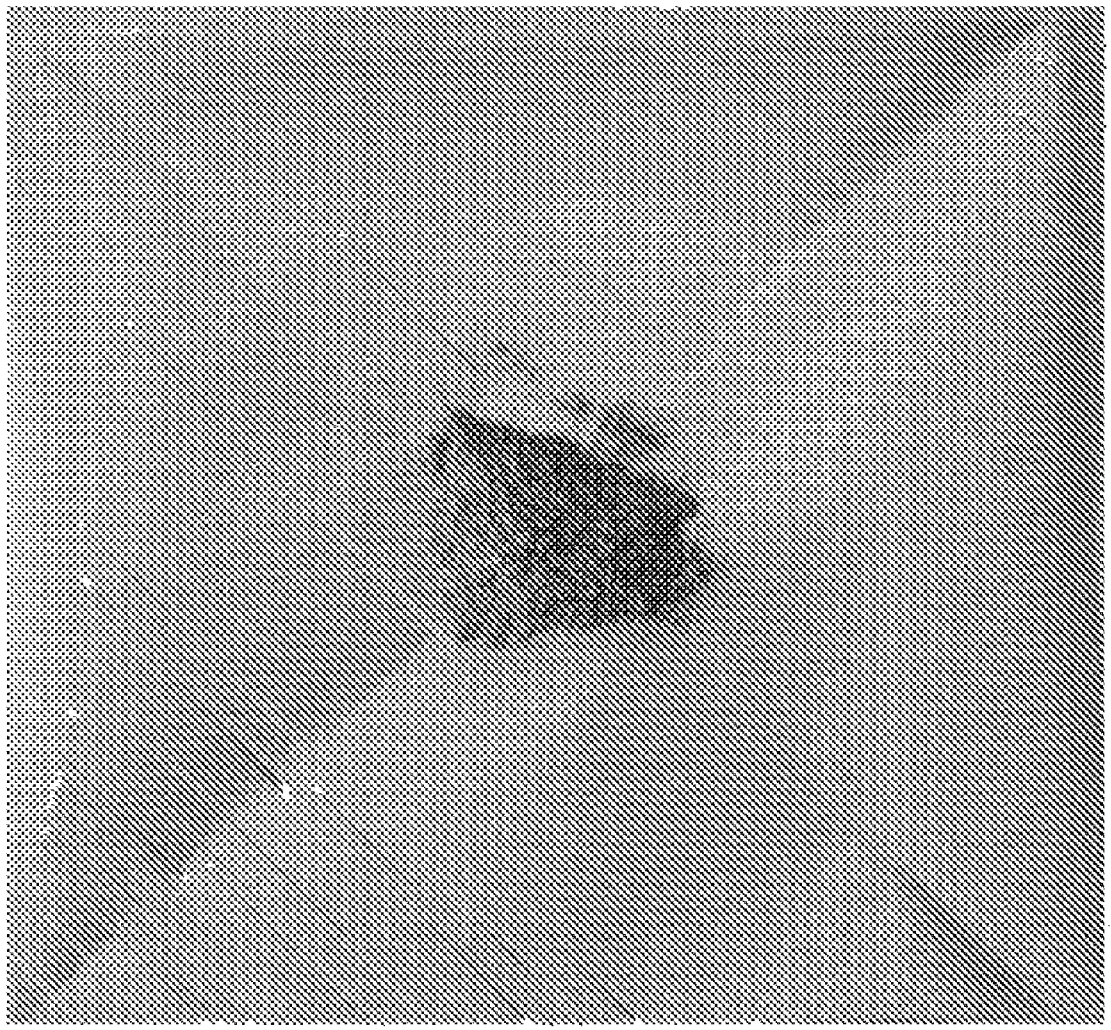
FIG. 3 shows a picture of CdSe/CdS quantum dot powder coated with zirconium dioxide/silicon dioxide.

The picture of the CdSe/CdS quantum dot powder coated with zirconium dioxide/silicon dioxide prepared by the two methods a and b in this embodiment is shown in FIG. 3. The CdSe/CdS quantum dot powder coated with zirconium dioxide/silicon dioxide is form of uniform powder and is orange (although the orange color cannot be identified in FIG. 3 due to the gray picture).

Embodiment 4

Preparation of the Core-Shell CdSe/CdS/ZnS Quantum Dot Coated with Aluminum Oxide/Silicon Dioxide a. (1) 30 mg of CdSe/CdS/ZnS quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 100° C.;

b. (1) 30 mg of CdSe/CdS/ZnS quantum dot solution, 220 μl of tetraethoxysilane and 0.4 mmol of aluminum isopropoxide were added in a reaction vessel and then mixed uniformly;

(2) the reaction system was stood for sol-gel reaction at a temperature of 40° C. and a relative humidity of 60%; and (3) the resulting product was calcinated at 100° C.;

c. (1) 30 mg of CdSe/CdS/ZnS quantum dot solution and 150 μl of di-sec-butoxyaluminoxytriethoxysilane solution were added in a high-pressure reactor, and nitrogen was fed to remove oxygen;

(2) the pyrolysis reaction was carried out for 12 hours at a temperature of 200° C.;

(3) the reaction system was centrifuged after completing the pyrolysis reaction to remove the unreacted quantum dot solution, and the resulting product was calcinated at 100° C.; and d. (1) 30 mg of CdSe/CdS/ZnS quantum dot solution, 220 μl of tetraethoxysilane and 0.4 mmol of aluminum isopropoxide were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Embodiment 5

Preparation of the CsPbBr$_3$ Quantum Dot Coated with Aluminum Oxide/Silicon Dioxide a. (1) 30 mg of CsPbBr$_3$ quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 50° C.; and b. (1) 30 mg of CsPbBr$_3$ quantum dot solution, 220 μl of tetraethoxysilane and 150 μl of aluminum tri-sec-butoxide were added in a reaction vessel and then mixed uniformly;

(2) the reaction system was stood for sol-gel reaction at a temperature of 25° C. and a relative humidity of 60%; and (3) the resulting product was calcinated at 50° C.

Figure 4:
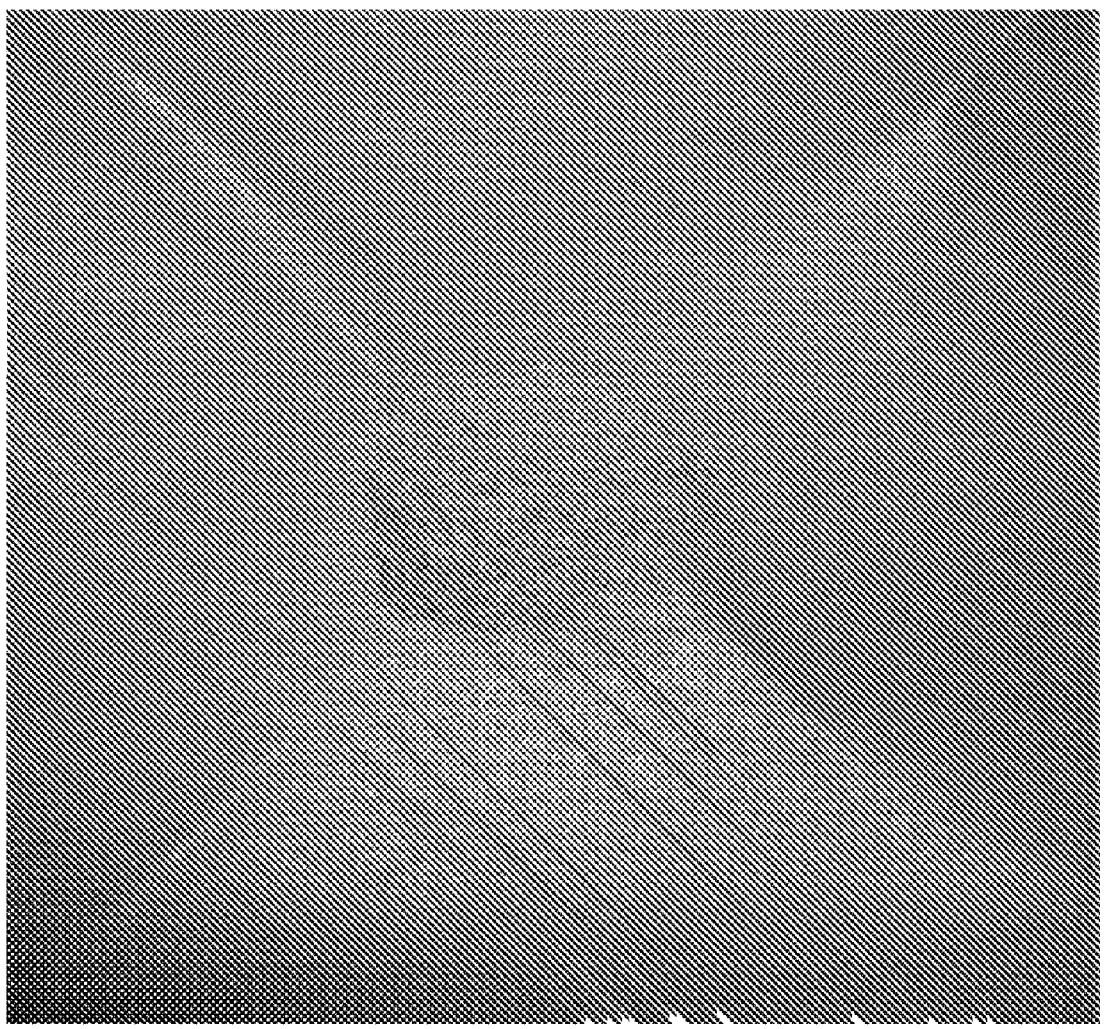
FIG. 4 shows a picture of $CsPbBr_3$ quantum dot powder coated with aluminum oxide/silicon dioxide.

The picture of the CsPbBr$_3$ quantum dot powder coated with aluminum oxide/silicon dioxide prepared by the two methods a and b in this embodiment is shown in FIG. 4. The CsPbBr$_3$ quantum dot powder coated with aluminum oxide/silicon dioxide is in form of uniform powder and is yellow (although the yellow color cannot be identified in FIG. 4 due to the gray picture).

Figure 5:
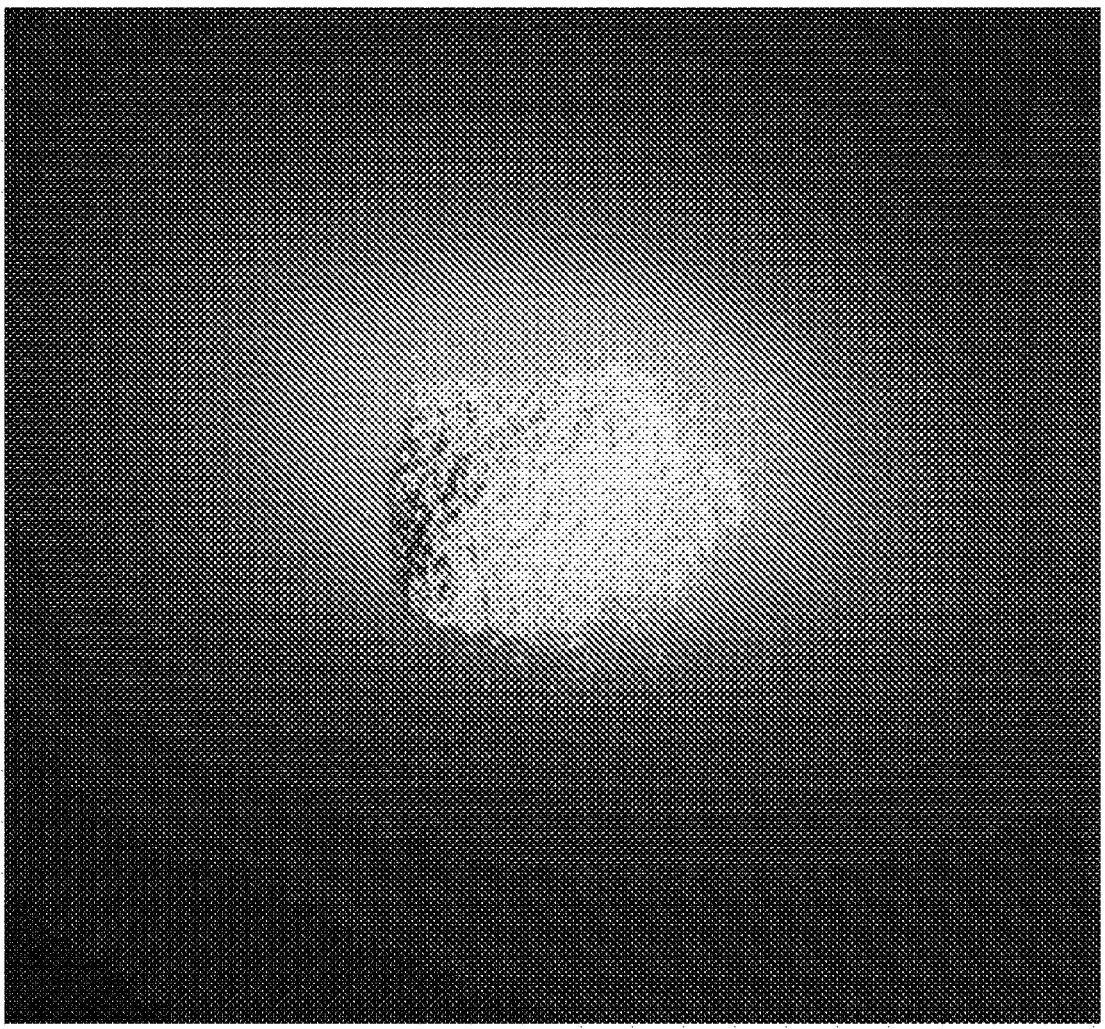
FIG. 5 shows a picture of $CsPbBr_3$ quantum dot powder coated with aluminum oxide/silicon dioxide under blue light.

The CsPbBr$_3$ quantum dot powder coated with aluminum oxide/silicon dioxide prepared by the two methods a and b in this embodiment is irradiated by blue light. As shown in FIG. 5, the CsPbBr$_3$ quantum dot powder coated with aluminum oxide/silicon dioxide under blue light is green (although the green color cannot be identified in FIG. 5 due to the gray picture).

Embodiment 6

Preparation of the Core-Shell CdSe/CdS:Al Quantum Dot Coated with Aluminum Oxide/Silicon Dioxide a. (1) 30 mg of CdSe/CdS:Al quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 100° C.;

b. (1) 30 mg of CdSe/CdS:Al quantum dot solution, 220 μl of tetraethoxysilane and 0.4 mmol of aluminum isopropoxide were added in a reaction vessel and then mixed uniformly;

(2) the reaction system was stood for sol-gel reaction at a temperature of 40° C. and a relative humidity of 60%; and (3) the resulting product was calcinated at 100° C.;

c. (1) 30 mg of CdSe/CdS:Al quantum dot solution and 150 μl of di-sec-butoxyaluminoxytriethoxysilane solution were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.; and d. (1) 30 mg of CdSe/CdS:Al quantum dot solution, 220 μl of tetraethoxysilane and 0.4 mmol of aluminum isopropoxide were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Embodiment 7

Preparation of the Core-Shell InP/ZnS Quantum Dot Coated with Aluminum Oxide/Silicon Dioxide a. (1) 30 mg of InP/ZnS quantum dot solution and 150 μl of di-sec-butoxyaluminoxytriethoxysilane solution were added in a reaction vessel and then mixed uniformly;

(2) the reaction system was stood for sol-gel reaction at a temperature of 25° C. and a relative humidity of 60%; and (3) the resulting product was calcinated at 100° C.;

b. (1) 30 mg of InP/ZnS quantum dot solution, 220 μl of tetraethoxysilane and 0.4 mmol of aluminum isopropoxide were added in a reaction vessel and then mixed uniformly;

(2) the reaction system was stood for sol-gel reaction at a temperature of 40° C. and a relative humidity of 60%; and (3) the resulting product was calcinated at 100° C.;

c. (1) 30 mg of InP/ZnS quantum dot solution and 150 μl of di-sec-butoxyaluminoxytriethoxysilane solution were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.; and d. (1) 30 mg of InP/ZnS quantum dot solution, 220 μl of tetraethoxysilane and 0.4 mmol of aluminum isopropoxide were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Embodiment 8

Preparation of the Core-Shell CdSe/CdS Quantum Dots Coated with Zirconium Dioxide/Silicon Dioxide a. (1) 30 mg of CdSe/CdS quantum dot solution, 100 μl of tetramethoxysilane and 150 μl of tetraisopropyl titanate solution were added in a reaction vessel and then mixed uniformly;

(2) the reaction system was stood for sol-gel reaction at a temperature of 25° C. and a relative humidity of 60%; and (3) the resulting product was calcinated at 100° C.; and b. (1) 30 mg of CdSe/CdS quantum dot solution, 100 μl of tetramethoxysilane and 150 μl of tetraisopropyl titanate solution were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Embodiment 9

Preparation of the Core-Shell CdSe/CdS Quantum Dots Coated with Zinc Oxide/Silicon Dioxide a. (1) 30 mg of CdSe/CdS quantum dot solution, 100 μl of tetramethoxysilane and 100 μl of diethyl zinc in toluene solution were added in a reaction vessel and then mixed uniformly;

(2) the reaction system was stood for sol-gel reaction at a temperature of 25° C. and a relative humidity of 60%; and (3) the resulting product was calcinated at 100° C.; and b. (1) 30 mg of CdSe/CdS quantum dot solution, 100 μl of tetramethoxysilane and 100 μl of diethyl zinc in toluene solution were added in a high-pressure reactor, and nitrogen was fed to remove oxygen from the high-pressure reactor;

(2) the pyrolysis reaction was carried out for 12 hours at a temperature of 200° C.; and (3) the reaction system was centrifuged after completing the pyrolysis reaction to remove the unreacted quantum dot solution, and the resulting product was calcinated at 100° C.

Embodiment 10

Photo-stability test of the CdSe/CdS/ZnS quantum dot coated with aluminum oxide/silicon dioxide prepared in Embodiment 4.

Figure 6:
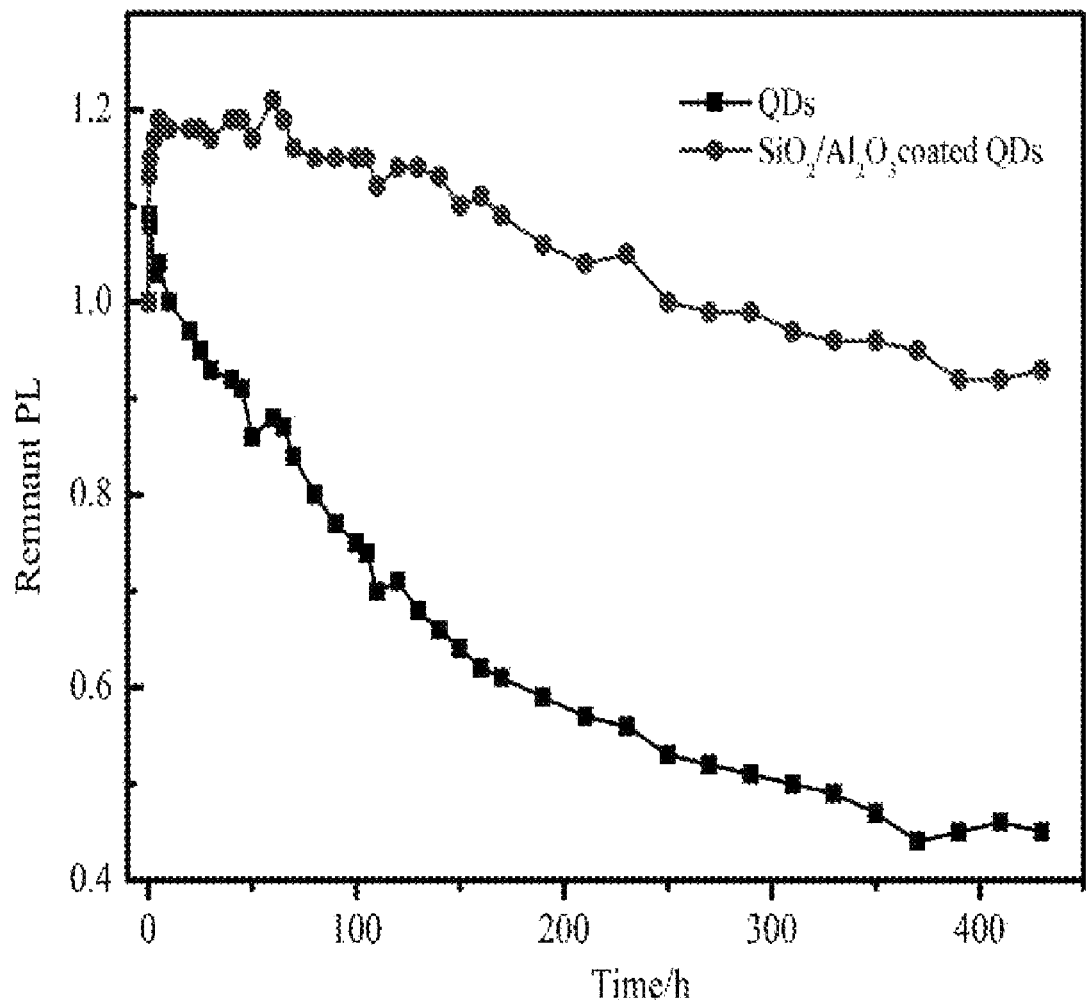
FIG. 6 is a diagram showing the light attenuation of CdSe/CdS/ZnS coated with aluminum oxide/silicon dioxide.

An equal amount of silicon dioxide gel was added in a same amount of CdSe/CdS/ZnS quantum dot solution and the CdSe/CdS/ZnS quantum dot coated with aluminum oxide/silicon dioxide, respectively followed by vacuumization at room temperature for 1 hour. Then, they were dropped on LED blue-light chips and cured under an ultraviolet lamp, respectively. Aging tests were carried out at a certain current and voltage (the power density was 5 w/cm$^2$), and the fluorescence intensity was tested within a certain time interval. An intensity-time attenuation curve was obtained by comparing the fluorescence peak intensity with the initial fluorescence peak intensity. FIG. 6 is a diagram showing the light attenuation of CdSe/CdS/ZnS coated with aluminum oxide/silicon dioxide. It can be known from FIG. 6 that, compared with the uncoated CdSe/CdS/ZnS quantum dot, the CdSe/CdS/ZnS coated with aluminum oxide/silicon dioxide is greatly improved in photo-stability.

The quantum dots prepared by the embodiments of the present application may be used in a form of composite monolith, or may be ground into powder as a fluorescent powder for use.

The descriptions of the embodiments are used for helping a person of ordinary skill in the art to understand and use the present invention. Apparently, those skilled in the art can easily make various modifications to these embodiments, and apply the general principle described herein in other embodiments and other luminescent material fields (e.g., fluorescent powder), without paying any creative effort. Therefore, the present invention is not limited to the embodiments and luminescent materials described above, and any improvements and modifications made according to the disclosure of the present application by those skilled in the art without departing from the scope of the present application shall fall within the scope of the present application.

What is claimed is:

1. A method for preparing a metal oxide/silicon dioxide-coated quantum dot, comprising:
    (1) adding a quantum dot solution, a silylating agent and a metal oxide-corresponding metal precursor into a high-pressure reactor to produce a mixture and feeding nitrogen to remove oxygen from the high-pressure reactor;
    (2) standing and subjecting the mixture to a pyrolysis reaction; and
    (3) centrifuging the resulting product after completing the pyrolysis reaction to remove the unreacted quantum dot solution, and calcinating the resulting product to obtain the metal oxide/silicon dioxide-coated quantum dot;
    wherein the metal oxide/silicon dioxide is selected from aluminum oxide/silicon dioxide, zirconium dioxide/silicon dioxide, titanium dioxide/silicon dioxide or zinc oxide/silicon dioxide, and a content of the metal oxide/silicon dioxide in the metal oxide/silicon dioxide-coated quantum dot is 1 to 98 wt %.

2. The method of claim 1, wherein the silylating agent is selected from tetramethoxysilane or tetraethoxysilane.

3. The method of claim 1, wherein the metal oxide-corresponding metal precursor is selected from an aluminum precursor, a zirconium precursor, a titanium precursor or a zinc precursor;
    wherein the aluminum precursor is selected from the group consisting of aluminum isopropoxide, aluminum tri-sec-butoxide, aluminum acetylacetonate and lithium tri-tert-butoxyaluminum hydride;
    the zirconium precursor is selected from the group consisting of zirconium propoxide, zirconium n-butoxide and zirconium acetylacetonate;
    the titanium precursor is tetraisopropyl titanate; and
    the zinc precursor is diethylzinc.

4. The method of claim 1, wherein in step (1), di-sec-butoxyaluminoxytriethoxysilane is used as both the silylating agent and the metal oxide-corresponding metal precursor as an aluminum precursor when the metal oxide/silicon dioxide is aluminum oxide/silicon dioxide.

5. The method of claim 1, wherein the pyrolysis reaction is carried out at a temperature of 160° C. to 220° C. for 6 to 24 hours, and a calcinating temperature is 50° C. to 150° C.

6. The method of claim 1, wherein in step (1), the quantum dot solution is a solution of a non-core-shell quantum dot or a core-shell quantum dot.

7. The method of claim 6, wherein the non-core-shell quantum dot is selected from a binary quantum dot, a ternary quantum dot, a quaternary quantum dot, a doped binary quantum dot, a doped ternary quantum dot or a doped quaternary quantum dot;
    wherein the binary quantum dot is $AX_1$, where A is selected from the group consisting of bismuth, cadmium, zinc, mercury, lead, tin, gallium, indium, calcium, strontium, cesium, magnesium, barium and copper, and $X_1$ is selected from the group consisting of sulfur, selenium, nitrogen, phosphorus, arsenic, tellurium and antimony;
    the ternary quantum dot is $A_1A_2X_2$, where each of $A_1$ and $A_2$ is selected from the group consisting of methylamino, bismuth, cesium, cadmium, zinc, mercury, lead, tin, gallium, indium, calcium, magnesium, strontium, barium and copper, $A_1$ is different from $A_2$, and $X_2$ is selected from sulfur, selenium, nitrogen, phosphorus, arsenic, tellurium, chlorine, bromine, iodine and antimony;

the quaternary quantum dot is $A_1A_2A_3X_3$, where each of $A_1$, $A_2$ and $A_3$ is selected from the group consisting of cadmium, zinc, mercury, lead, tin, gallium, indium, calcium, cesium, magnesium, strontium, barium and copper, $A_1$, $A_2$ and $A_3$ are different from each other, and $X_3$ is selected from sulfur, selenium, phosphorus, arsenic, tellurium or antimony; and a doping element for a doped quantum dot is selected from the group consisting of magnesium, calcium, barium, strontium, aluminum, boron, zirconium, chromium, titanium, silver, gallium, hafnium, indium, bismuth, cobalt, copper, manganese, nickel, iron, tantalum and silicon.

8. The method of claim 6, wherein the core-shell quantum dot comprises a core quantum dot and a shell, wherein the core quantum dot is selected from a binary quantum dot, a ternary quantum dot, a quaternary quantum dot, a doped binary quantum dot, a doped ternary quantum dot or a doped quaternary quantum dot; and the shell comprises a main body made of a semiconductor material selected from Group II-VI, II-V, III-VI, III-V, IV-VI, II-IV-V or II-IV-VI elements, the semiconductor material being selected from the group consisting of cadmium selenide, zinc selenide, mercury selenide, cadmium sulfide, zinc sulfide, mercury sulfide, cadmium telluride, zinc telluride, cadmium telluride, gallium nitride, indium nitride, gallium phosphide, gallium antimonide, indium gallium phosphide, zinc cadmium selenide and cadmium zinc sulfide; and a doped core-shell quantum dot comprises a doping element which is located in at least one of the core quantum dot and the shell, and the doping element is selected from the group consisting of magnesium, calcium, barium, strontium, aluminum, boron, zirconium, chromium, titanium, silver, gallium, hafnium, indium, bismuth, cobalt, copper, manganese, nickel, iron, tantalum and silicon.

* * * * *